United States Patent [19]

Tsushima et al.

[11] 4,042,496

[45] Aug. 16, 1977

[54] PROCESS FOR PREPARING IMPROVED CATION-EXCHANGE MEMBRANES

[75] Inventors: Sakae Tsushima; Teruyuki Misumi, both of Yokohama; Masahiko Murakoshi, Tokyo, all of Japan

[73] Assignee: Asahi Kasei Kogyo Kabushiki Kaisha, Osaka, Japan

[21] Appl. No.: 581,491

[22] Filed: May 28, 1975

[30] Foreign Application Priority Data

May 29, 1974 Japan .................................. 49-59779

[51] Int. Cl.$^2$ ............................................ B01D 13/00
[52] U.S. Cl. ............................. 210/23 R; 210/500 M; 210/506; 204/180 P; 204/181
[58] Field of Search ...................... 210/22, 23, 75, 193, 210/500 M, 506; 204/180 B, 180 P, 181; 260/879

[56] References Cited

U.S. PATENT DOCUMENTS

| | | | |
|---|---|---|---|
| 3,503,789 | 3/1970 | Johnson et al. | 210/23 H X |
| 3,510,418 | 5/1970 | Mizutani et al. | 204/180 P X |
| 3,723,306 | 3/1973 | Bridgeford | 210/22 |
| 3,754,055 | 8/1973 | Rembaum | 260/879 |

*Primary Examiner*—Frank A. Spear, Jr.
*Assistant Examiner*—Ferris H. Lander
*Attorney, Agent, or Firm*—Cooper, Dunham, Clark, Griffin & Moran

[57] ABSTRACT

An improved cation-exchange membrane, onto which have been adhered fine particles of a crosslinked high molecular weight substance having anion-exchange groups and which can maintain a specific permselectivity for monovalent cations over a long period of time, is prepared with ease by treating a cation-exchange membrane with a suspension of fine particles of the said crosslinked high molecular weight substance.

8 Claims, No Drawings

PROCESS FOR PREPARING IMPROVED CATION-EXCHANGE MEMBRANES

This invention relates to a process for producing an improved cation-exchange membrane having a specific permselectivity for monovalent cations.

When sea water is subjected to electrodialysis by use of a cation-exchange membrane, there are brought about such drawbacks as mentioned below.

1. Crystals of gypsum tend to form in the concentration chamber of the dialysis cell to cause operation disadvantages.
2. If large amounts of Mg and/or Ca salts are accumulated in the concentration chamber at the time of production of sodium chloride, not only electric current is wastefully consumed but also industrial burden in the sodium chloride crystallization step becomes great.

The above-mentioned drawbacks are ascribable to the fact that polyvalent cations such as $Mg^{++}$ and $Ca^{++}$ are somewhat more easily permeable through the cation-exchange membrane than monovalent cations such as $Na^+$ and $K^+$.

In order to overcome the aforesaid drawbacks, there has heretofore been proposed a process in which the cation-exchange membrane is treated with a water-soluble substance containing cations and having a molecular weight of 100 or more (U.S. Pat. Nos. 3,510,417, 3,510,418 and 3,784,457), or an electrodialysis process in which the liquid to be dialyzed is incorporated with such substance as mentioned above to enhance the cation-exchange membrane in permeability for $Na^+$, $K^+$, etc. This process, though simple, has such disadvantage that the operation of adding the treating agent to the liquid to be dialyzed or of impregnating the cation-exchange membrane with the treating agent should occationally be conducted. Moreover, there is such fear that the said water-soluble substance, i.e. the treating agent, would contaminate waste water and product. Furthermore, life of the membrane is rather short.

Another proposal is that a linear high molecular weight electrolyte having easily crosslinkable reactive functional groups composed mainly of anion exchange groups is adhered as a thin layer onto the surface of a cation-exchange membrane and is then subjected to crosslinking treatment to form cross-linkage between the layer and the membrane (U.S. Pat. No. 3,784,457). This process has no such disadvantage as in the aforesaid process, but is somewhat complex in procedure for treatment of the membrane.

An object of the present invention is to provide a process for preparing a cation-exchange membrane with ease which is excellent in limiting current density and which has a specific permselectivity for monovalent cations.

Another object of the present invention is to provide a process for preparing a cation-exchange membrane which has a specific permselectivity for monovlent cations and which can maintain said property over a long period of time.

A further object of the present invention is to provide a process for preparing a cation-exchange membrane which can also be applied to treatment of water containing lower as well as higher molecular weight substances having anionic dissociable groups such as phenol groups, carboxyl groups, phosphate groups or sulfonate groups, cationic dissociable groups such as primary, secondary or tertiary amines or quaternary ammonium base groups, or neutral dissociable groups such as hydroxyl groups, in addition to poly-valent cations.

Further object of the present invention is to provide a process for preparing a cation-exchange membrane which can be used for the following apparatuses:

1. a two compartment electrolytic cell where cathode and anode are provided at the both sides of the present membrane,
2. a multi-compartment electrolytic cell where cathode and anode are provided at the both sides of combined membranes composed of the present cation-exchange and at least one membrane selected from conventional anion-exchange membrane and neutral membrane,
3. a multi-compartment electrodialysis cell for concentration or de-salting wherein the present membrane and at least one membrane selected from conventional anion-exchange membrane and neutral membrane are alternately arranged to form plural pairs, and then anode and cathode are provided at the both sides of a block of the pairs,
4. a diffusion dialysis cell where pairs of combination of the present membrane and, if necessary, at least one membrane selected from conventional anion exchange membrane and neutral membrane are used, said anion-exchange membrane being, preferably, superior in permselectivity for anions.

In accordance with the present invention, there is provided a process in which a cation-exchange membrane is treated with a suspension of fine particles of a crosslinked high molecular weight substance having an anion exchange group, thereby adhering said fine particles onto the surface of the cation-exchange membrane.

The above-mentioned anion-exchange group is at least one member selected from quaternary ammonium groups, quaternary pyridinium groups, sulfonium bases, primary, secondary and tertiary amino groups, pyridine groups and imino groups.

As the crosslinked high molecular weight substance, there may be used every one of those which have heretofore been known as substances of this kind. The crosslinked high molecular weight substance having anion-exchange group may roughly be divided, according to the manner of preparation thereof, as follows:

1. A copolymer prepared by introducing an anion-exchange group into a copolymer composed of a polyvinyl compound monomer and a vinyl compound monomer having a group into which an anion-exchange group can easily be introduced.

As the polyvinyl compound monomer, there is used a diacrylate or dimethacrylate of divinylbenzene, trivinylcyclohexane, ethylene glycol or polyethylene glycol, divinyltoluene, divinylsulfone, divinylnaphthalene or trivinylbenzene.

As the vinyl monomer having a group into which an anion-exchange group can easily be introduced, there is used styrene, vinyltoluene, chloromethylstyrene, glycidyl methacrylate or vinyl-naphthalene.

For example, the said copolymer is prepared in such a manner that a crosslinked copolymer of styrene and divinylbenzene is chloromethylated with chloromethyl methyl ether and then aminated with trimethylamine.

2. A copolymer composed of a polyvinyl compound monomer and a basic nitrogen-containing vinyl compound monomer which, if necessary, has been brought into the form of a quaternary ammonium salt:

As the polyvinyl compound monomer, there may be used the monomer described in the preceding item 1.

As the basic nitrogen-containing vinyl compound monomer, there is used a vinylpyridine derivative such as 2-vinylpyridine, 4-vinylpyridine or 2-methyl-5-vinylpyridine; a vinylpiperidine derivative such as 2-vinylpiperidine; a vinylquinoline derivative such as 2-vinylquinoline; a vinylimidazole derivative such as 2-vinylbenzimidazole or N-vinyl-2-methylimidazole; a vinylcarbazole derivative; vinylaniline; or dimethylaminoethyl methacrylate.

As the alkylating agent, there is used a halogenated alkyl such as methyl iodide or methyl chloride; or a sulfuric acid ester such as dimethyl sulfate.

For example, the said copolymer is prepared in such a manner that a crosslinked copolymer of trivinylcyclohexane and 2-methyl-5-vinylpyridine is 5-vinylpyridine into a quaternary pyridinium salt by treatment with methyl chloride.

3. A basic nitrogen-containing linear polymer which has partly or totally been crosslinked and alkylated with a polyfunctional alkylating agent:

As the basic nitrogen-containing polymer, there may be used a linear polymer of the basic nitrogen-containing vinyl compound monomer described in the preceding item 2, such as poly-4-vinylpyridine or polyvinylimidazole, or a polyethyleneimine.

As the polyfunctional alkylating agent, there is used a haloepoxy compound such as epichlorohydrin; a dihalogenated alkyl such as diiodoethane or dibromoethane; or a diepoxy compound such as bis(2,3-epoxypropyl) ether.

For example, the said substance is prepared by crosslinking and alkylating poly-4-vinylpyridine with epichlorohydrin.

4. A polymer prepared from a polycondensable monomer having an anion-exchange group and a linking agent for said monomer:

In order to obtain a three-dimensional polymer, either one of the said monomer and linking agent should be a compound having 3 or more functional groups.

As the polycondensable monomer having an anion-exchange group, there is used quanidine, dicyandiamide, ethyleneimine, a polyalkylene-polyamine such as diethylenetriamine, tetraethylene-pentamine or pentaethylene-hexamine, an aliphatic polyamine such as ethylenediamine, 1,3-diaminopropane or 1,4-diamino-n-butane, or an aromatic amine such as methaphenilenediamine, dimethyl (4-oxybenzyl)amine, aniline or methatoluidine. As the linking agent, there is used phenol, resorcinol, naphthol, an aldehyde such as formaldehyde, para-aldehyde, glyoxal or furfural, a haloepoxy compound such as epichlorohydrin, a dihalogenated alkyl such as iodoethane or dibromoethane, or a diepoxy compound such as bis(2,3-epoxypropyl) ether.

Among the above-mentioned crosslinked anion exchangers mentioned in the items 1 to 4, one which is prepared by the process of item 2 is particularly preferable. Furthermore, the anion-exchange group is desirably used in the form of a quaternary ammonium salt.

In order to properly control the concentration of the anion-exchange group in the crosslinked polymer, there may be used an appropriate comonomer or linking agent.

The cation-exchange membrane used as the matrix in the present invention may be any of those which are available at present.

Generally, the polymer prepared in the above manner is dried and pulverized, and the resulting particles are used in a state suspended in water or in an aqueous solution of a water-soluble salt such as, for example, sodium chloride, calcium chloride or $Na_2SO_4$. The suspended state of the particles is such that in case the particles are large, the particles themselves can be observed by a microscope, while in case the particles are small, only a Tyndall light is observed.

Desirable conditions to be satisfied by the particles are as follows:

1. Exchange capacity: 0.5 m. equiv/g (dry) or more
2. Particle diameter: 10.0 $\mu$ or less
3. Degree of crosslinking:

The content of crosslinking agent in the polymer particles is preferably 0.1 to 10% in terms of a bifunctional monomer.

The concentration of the polymer particles in the suspension is desirably about 1 to 50 g. dry resin per liter.

For the treatment of a fresh cation-exchange membrane, there is adopted such procedure that the membrane is immersed in the above-mentioned suspension at 10° to 150° C. for several minutes to several hours. During this period, the suspension is desirably circulated.

For the regeneration of a spent membrane, which has degraded in specific permselectivity due to dialysis, there is adopted such procedure that the above-mentioned suspension is flowed on the membrane surface at a temperature in the range from room temperature to 80° C. for 10 minutes to 5 hours. In this case, the dialysis cell is not required to be disassembled for regeneration, in general, and the regeneration treatment may be conducted while allowing the cell to stand as it is. Furthermore, the regeneration treatment may be carried out while applying a current to the cell.

In the case of an intreated cation-exchange membrane, the specific permselectivity thereof for $Mg^{++}$ to $Na^+$ is about 1.4 to 1.5, whereas in the case of a cation-exchange membrane, which has been subjected to the present treatment, the said specific permselectivity is 1.0 or less at the worst and 0.08 or less at the best. Even according to a process similar to that of the present invention in which the treatment is carried out by use of, for example, an aqueous solution of an uncrosslinked anion-exchange polymer, e.g. 4-vinylpyridine polymer, there are some cases where a value of 0.08 or less can be obtained. However, a characteristic of the present process resides in that the specific permselectivity for monovalent ions can be maintained over a long period of time. Particularly, a spent membrane, which has once been regenerated according to the present invention, is extremely great in maintenance of specific permselectivity for monovalent ions, in general, and does not require any additional regeneration treatment, in practice. This point is a particularly marked feature of the present invention, and offers extremely advantageous conditions in the operation of electrodialysis.

In the conventional treatment for enhancing a cation-exchange membrane in specific permselectivity for monovalent ions, there were many cases where the increase in electric resistance of the membrane was worried. Even when a membrane is treated according to the present process, the electric resistance thereof becomes scarcely different from that of an untreated membrane, and even if there is brought about more or less increase in electric resistance, such increase is so slight so as to be negligible.

The present invention is illustrated in detail below with reference to examples.

In the examples, the specific permselectivity is that for Mg++ and is defined by the following formula:

$$F_{Mg} = \frac{T_{Mg}/T_{Na}}{C_{Mg}/C_{Na}}$$

wherein
- $C_{Na}$: Normal concentration of Na+ ions in the dilution chamber liquid.
- $C_{Mg}$: Normal concentration of Mg++ ions in the dilution chamber liquid. (In the experiments, the values of $C_{Na}$ and $c_{Na}$ and $C_{Mg}$ were those in sea water)
- $T_{Na}$: Equivalent number per Faraday's constant of Na+ ions permeating though the membrane.
- $T_{Mg}$: Equivalent number per Faraday's constant of Mg++ ions permeating through the membrane.

Selective permselectivity for other polyvalent ions than Mg++ ions is approximately proportional to that for Mg++ ions, though the two vary in absolute value. In the examples, therefore, the specific permselectivity for polyvalent ions was represented by $F_{Mg}^{++}$.

EXAMPLE 1

A mixture comprising 96 parts by weight of 4-vinylpyridine (all amounts hereinafter specified by weight unless otherwise stated, 4 parts of divinylbenzene (purity 56%), 0.3 part of benzoyl peroxide and 400 parts of n-hexane was sealed in a nitrogen-flushed ampoule, and was polymerized with shaking at 60° C. for 20 hours. The resulting polymer was washed with n-hexane and then with methanol. The washed polymer was treated at 40° C. for 20 hours with a hexane solution (25%) of methyl iodide to convert the polymer into a quaternary pyridinium base. Subsequently, the thus treated polymer was recovered by filtration, dried, pulverized to less than 3 microns by means of a ball mill, and then suspended in 200 times the weight thereof of water to prepare a treating liquid.

A cation-exchange membrane Aciplex K-101 (a sulfonation product of styrene-divinylbenzene copolymer; produced by Asahi Kasei Kogyo Kabushiki Kaisha) was subjected to primary treatment in the above-mentioned treating liquid while circulating the liquid at 95° C. for 20 hours. Using the thus treated cation-exchange membrane, sea water was concentrated according to multi-chamber type electrodialysis. The electrodialysis operation was continued for 60 days under such conditions as a current density of 4.0 A/dm², and a flow rate of sea water of 3 cm/sec. at the dilution chamber side and of 0.5 cm/sec. at the concentration chamber side. Thereafter, the operation was discontinued, and the membrane was subjected to regeneration treatment at 40° C. for 3 hours while circulating the aforesaid treating liquid in the dialysis cell. After the regeneration of the membrane, the same electrodialysis as above was continued for 60 days. The specific permselectivity, and the variation speed of specific permselectivity, of the membrane before and after regeneration were as shown in the following table:

|  | Specific permselectivity | | Variation speed of specific permselectivity* | |
| --- | --- | --- | --- | --- |
|  | After primary treatment | After regeneration | After primary treatment | After regeneration |
| $F_{Mg}$ | 0.063 | 0.065 | $3.6 \times 10^{-3}$ | $1.3 \times 10^{-5}$ |

*The variation speed of specific permselectivity is the amount of $F_{Mg}$ varied per day, and is represented by $\Delta F_{Mg}$/day.

REFERENCE EXAMPLE

A polymer was prepared in the same manner as in Example 1, except that only 4-vinylpyridine was used as polymerizable monomer. This polymer was linear and watersoluble, and hence was not required to be pulverized. The thus prepared linear polymer was dissolved in 200 times the weight thereof of water to prepare a treating agent. Using this treating agent, the same treatment as in Example 1 was effected. As the result, the specific permselectivity, and the variation speed of specific permselectivity, of the membrane were as shown in the following table:

|  | Specific permselectivity | | Variation speed of specific permselectivity | |
| --- | --- | --- | --- | --- |
|  | After primary treatment | After regeneration | After primary treatment | After regeneration |
| $F_{Mg}$ | 0.13 | 0.15 | $5.4 \times 10^{-3}$ | $4.8 \times 10^{-3}$ |

From the above results, it is clear that in case a linear polymer solution is used as the treating agent, the membrane used in, for example, a sea water dialysis apparatus should be regenerated once per 2 to 3 months, whereas in case a crosslinked polymer suspension is used as the treating agent, a membrane is scarcely required to a regenerated if it has once been regenerated.

EXAMPLE 2

A mixture comprising 94 parts of N-vinyl-2-methylimidazole, 6 parts of divinylbenzene (purity 56%) and 0.4 part of azobisisobutyronitrile was dissolved in 400 parts of n-hexane, and then heat-polymerized in a nitrogen-flushed ampoule at 60° C for 20 hours. The resulting polymer was washed with hexane and methanol in this order, and then pulverized to less than 3 microns. The pulverized polymer was alkylated at 40° C. for 10 hours with a n-hexane solution containing 25 wt% of methyl iodide, and then suspended in 300 times the weight thereof of a 0.1N-CaCl₂ solution to prepare a treating liquid. Using this treating liquid, the same treatment as in Example 1 was effected. As the result, the specific permselectivity, and the variation speed thereof, of the membrane as measured in the same manner as in Example 1 were as shown in the following table:

|  | Specific permselectivity | | Variation speed of specific permselectivity | |
| --- | --- | --- | --- | --- |
|  | After primary treatment | After regeneration | After primary treatment | After regeneration |
| $F_{Mg}$ | 0.058 | 0.061 | $3.2 \times 10^{-3}$ | $1.1 \times 10^{-5}$ |

EXAMPLE 3

A mixture comprising 100 parts of styrene, 5 parts of divinylbenzene (purity 56%) and 0.1 part of azobisisobutyronitrile was subjected to suspension polymerization in water to obtain particles of a crosslinked polymer composed of styrene and divinylbenzene. The thus obtained particles were sufficiently washed with toluene, dried and then pulverized to less than 2 microns by means of a ball mill. The resulting fine particles were chloromethylated at 40° C. for 20 hours in a mixed liquid consisting of 80 parts of methyl chloromethyl ether and 20 parts of tin chloride, sufficiently washed with methanol, and then aminated at 50° C. for 24 hours with a 10% methanol solution of trimethylamine. Subsequently, the fine particles were suspended in about 400 times the weight thereof of an aqueous 0.5N-NaCl solution to prepare a treating liquid. Using this treating liquid, the same treatment as in Example 1 was effected. As the result, the specific permselectivity, and the variation speed thereof, of the membrane as measured in the same manner as in Example 1 were as shown in the following table:

|  | Specific permselectivity | | Variation speed of specific permselectivity | |
|---|---|---|---|---|
|  | After primary treatment | After regeneration | After primary treatment | After regeneration |
| $F_{Mg}$ | 0.088 | 0.095 | $3.1 \times 10^{-3}$ | $0.96 \times 10^{-5}$ |

EXAMPLE 4

To 500 g. of an aqueous solution containing 20 wt% of a polyethyleneimine having an average polymerization degree of 1,000 (wherein the ratio of primary, secondary and tertiary nitrogen atoms was approximately 1 : 2 : 1), aqueous solutions of formalin and hydrochloric acid were added so that the amount of formalin became 0.06 mole and that of hydrochloric acid became 0.1 mole. The resulting mixed solution was stirred at 40° C. for 5 hours to deposit a large amount of a gel. The deposited gel was recovered by filtration, dried, pulverized to less than 3 microns, and then suspended in 300 times the amount thereof of sea water to prepare a treating liquid. Using this treating liquid, the same treatment as in Example 1 was effected. As the result, the specific permselectivity, and the variation speed thereof, of the membrane as measured in the same manner as in Example 1 were as shown in the following table.

|  | Specific permselectivity | | Variation speed of specific permselectivity | |
|---|---|---|---|---|
|  | After primary treatment | After regeneration | After primary treatment | After regeneration |
| $F_{Mg}$ | 0.066 | 0.083 | $2.9 \times 10^{-3}$ | $1.9 \times 10^{-5}$ |

What is claimed is:
1. A process for improving a cation-exchange membrane in specific permselectivity for monovalent ions which comprises contacting the cation-exchange membrane with a suspension, in water or in an aqueous solution of a salt containing said monovalent ions, of particles of a crosslinked high molecular weight substance having an anion-exchange group.
2. A process for electrolyzing sodium chloride by use of a cation-exchange membrane treated with the process of claim 1.
3. A process according to claim 1, wherein the crosslinked high molecular weight substance is a compound prepared by converting into a quaternary ammonium salt a copolymer composed of a basic nitrogen-containing vinyl compound monomer and a polyvinyl compound monomer.
4. A process according to claim 2, wherein the cation-exchange membrane is a membrane prepared from a quaternary ammonium salt of a copolymer composed of a basic nitrogen-containing vinyl compound monomer and a polyvinyl compound monomer.
5. A process for treating water containing lower and higher molecular weight substances with use of a cation-exchange membrane treated with the process of claim 1.
6. A process as in claim 1 wherein the particles have the following characteristics:
   1. exchange capacity: at least 0.5 m. equiv/g (dry),
   2. particle diameter: up to 10.0 microns,
   3. degree of crosslink: 0.0 to 10% based on bifunctional monomer.
7. A process as in claim 5 wherein the particles are based on quaternary ammonium salt.
8. A process as in claim 1 wherein the concentration of polymer particles in the suspension is from 1 to 50 grams of dry resin per liter.

* * * * *